Inventor
Harry Whitesell,
by Atty.

April 16, 1963  H. WHITESELL  3,085,568
PHYSIO-THERAPY APPARATUS
Filed Aug. 2, 1960  7 Sheets-Sheet 2

Inventor,
Harry Whitesell
by ~~~ Atty.

April 16, 1963 H. WHITESELL 3,085,568
PHYSIO-THERAPY APPARATUS
Filed Aug. 2, 1960 7 Sheets-Sheet 3
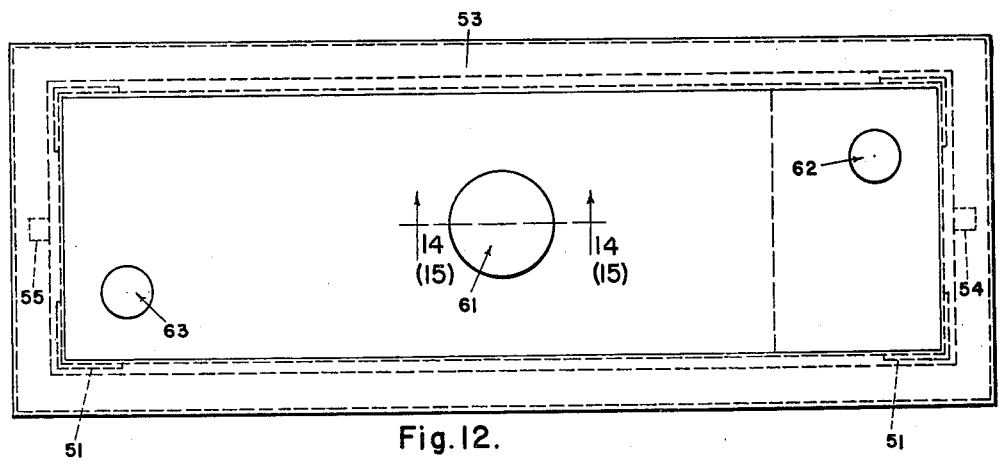
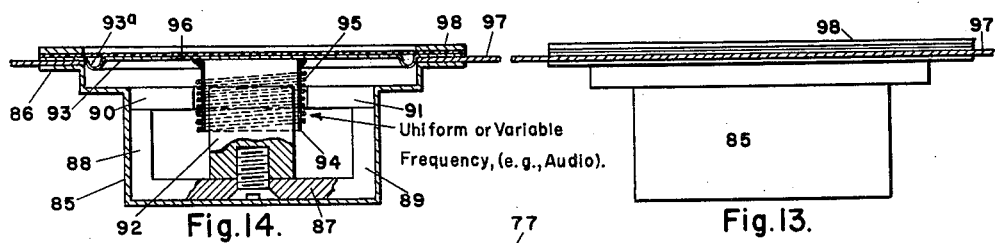
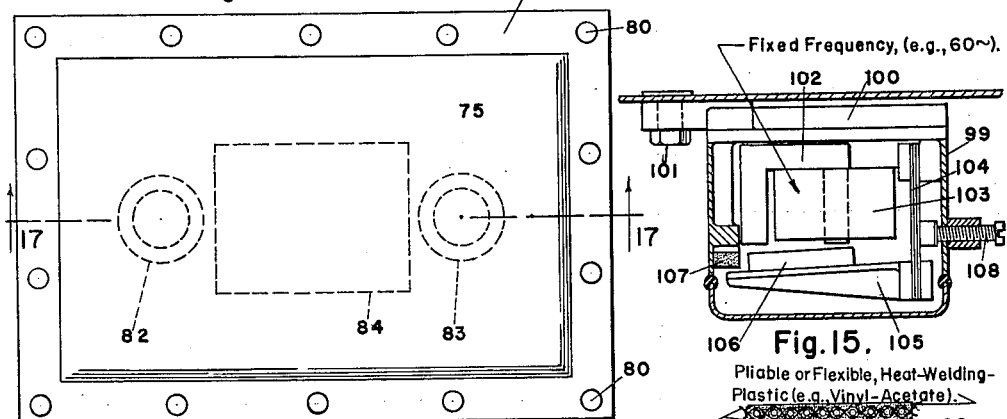
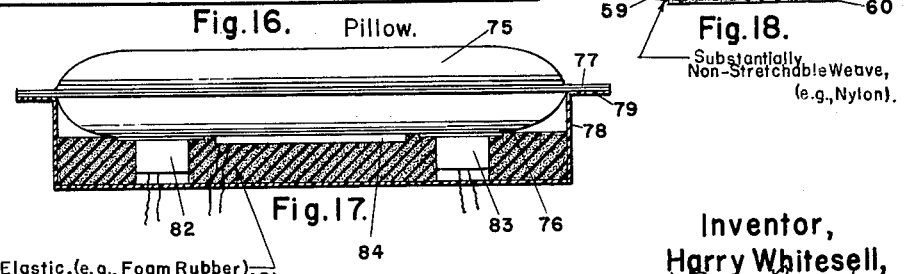
Inventor,
Harry Whitesell,
by _____ Atty.

April 16, 1963  H. WHITESELL  3,085,568
PHYSIO-THERAPY APPARATUS
Filed Aug. 2, 1960  7 Sheets-Sheet 4
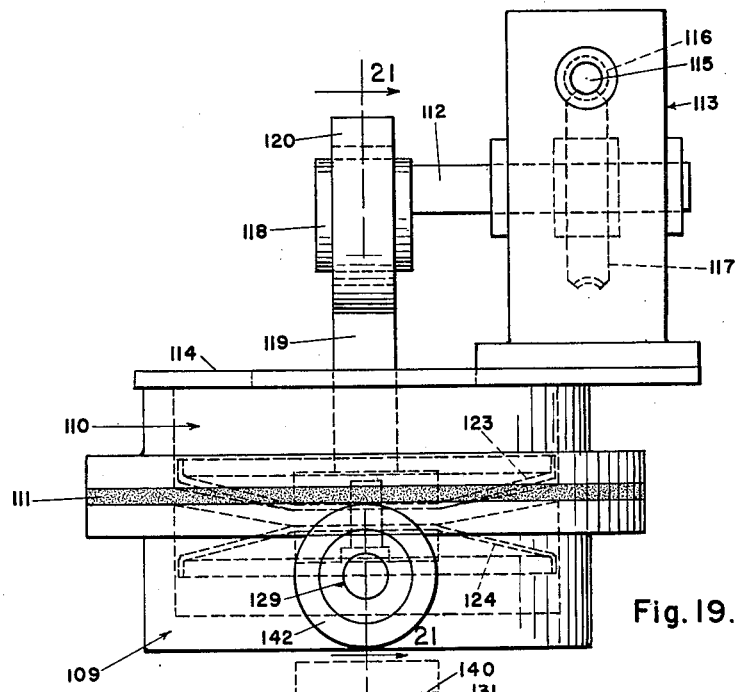
Fig. 19.
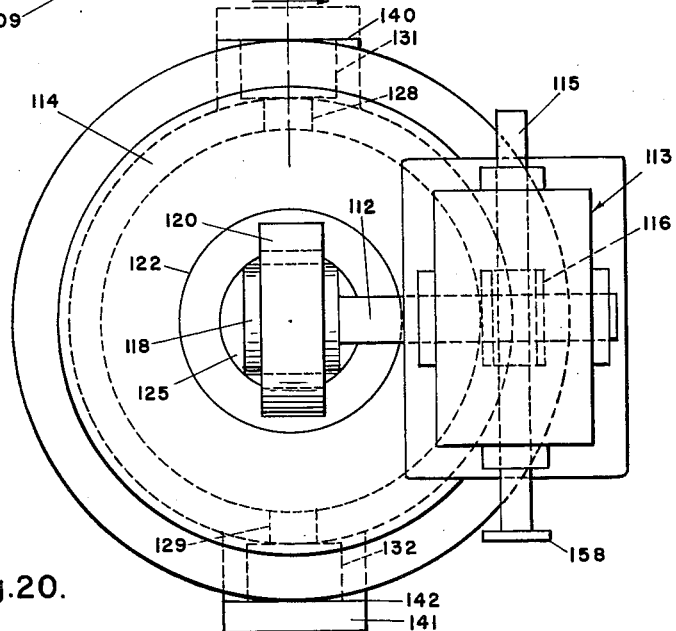
Fig. 20.
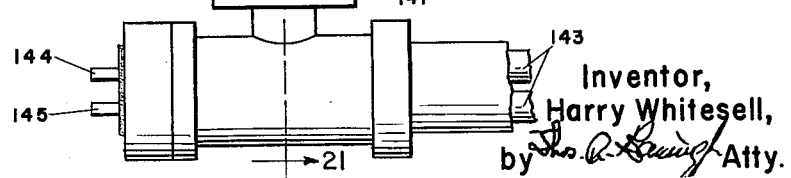
Inventor,
Harry Whitesell,
by ⟨signature⟩ Atty.

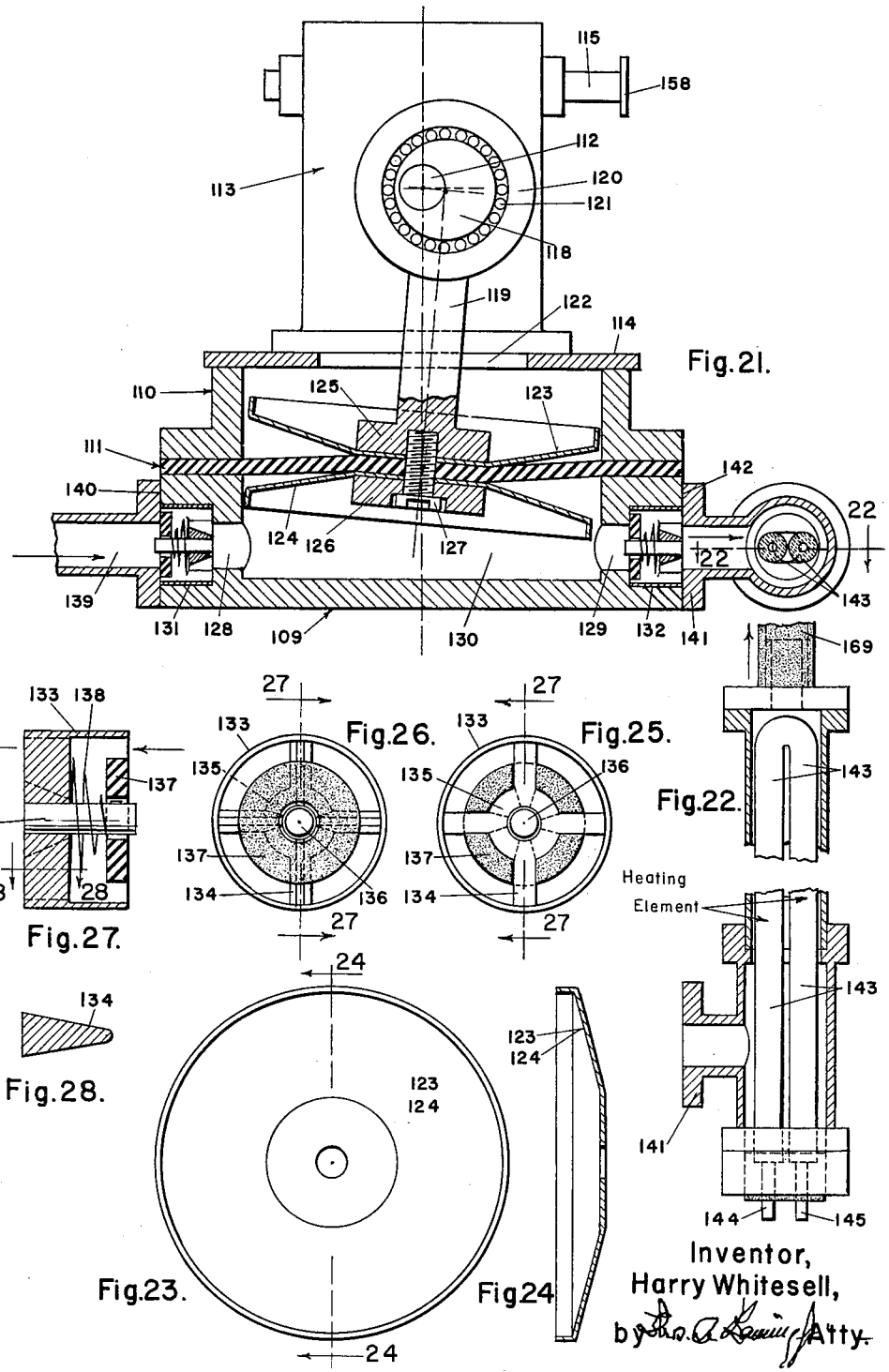

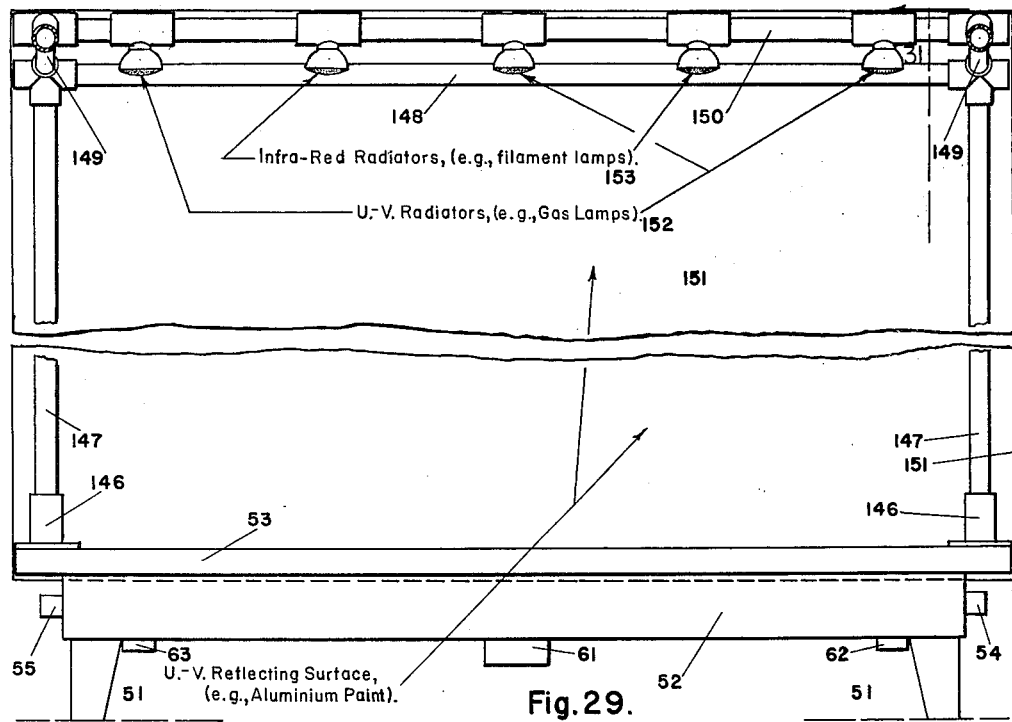
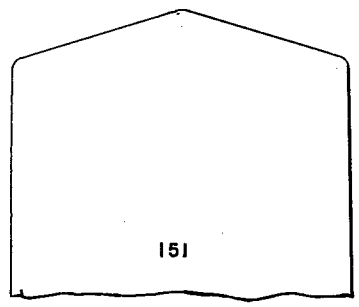
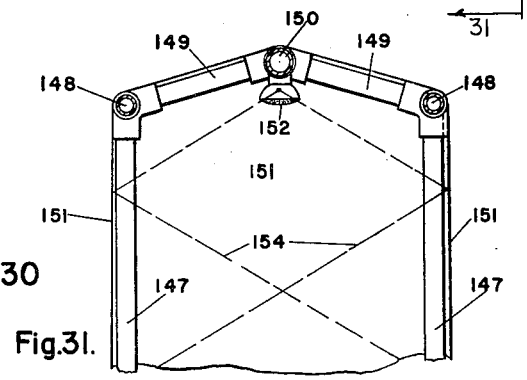
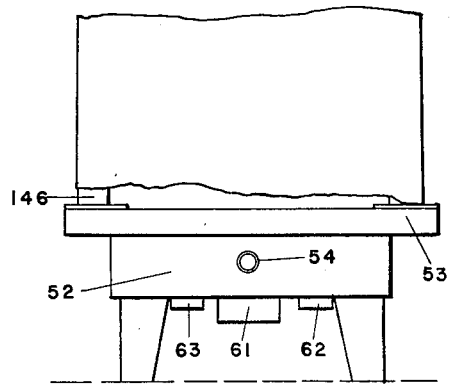
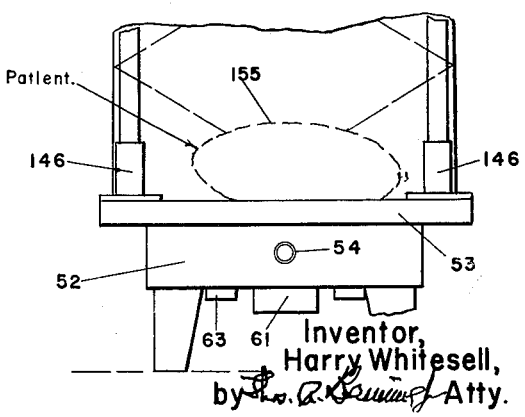

United States Patent Office 3,085,568
Patented Apr. 16, 1963

3,085,568
PHYSIO-THERAPY APPARATUS
Harry Whitesell, % Patrician Apts., 401 Fullerton
Parkway, Chicago, Ill.
Filed Aug. 2, 1960, Ser. No. 47,059
7 Claims. (Cl. 128—33)

This invention relates to improvements in physio-therapy apparatus, and the like. Broadly stated, the invention relates to a method and apparatus for subjecting the human body, or large or restricted areas of such human body, or both large and restricted areas of such human body, to physical vibrations of selected frequency or selected frequencies, such frequency or frequencies being applied to selected areas of such human body under control at all times. Thus, provision has been made for applying such vibrations to substantially the entire area of the back or front of the human body, or to selected limited areas thereof, such, for example, as the back of the head and the neck of the patient, or to another selected area or areas. Also, provision has been made for applying to such selected area or areas vibrations either slow or fast or even ultra-sonic, depending on the area of the body being treated, and the effect which it is desired to produce. Included in such "slow" vibrations may be vibrations of the frequency of the breathing of the patient, or of the frequency of the patient's heart-beats, or both such frequencies applied simultaneously, or separately to selected areas of the patient's body. Included in such "fast" vibrations may be sonic or even ultra-sonic frequencies; and included in such sonic frequencies may be music or other variable frequencies adapted to the patient's needs or desires. Such "fast" frequencies may be applied either to the patient's head and the back portion of his neck, or even to substantially his entire bodily area, either back or front.

In order to effect transmission of the produced vibrations to the selected area, either large or small, of the human body, with production of the desired effects on the anatomy, it is desirable to provide means whereby such produced vibrations shall be brought to good physical engagement with the intended portion of the human body, over the entire area to be treated and while such area of such human body is in a normal position or posture, and with accommodation of the vibration producing element or elements to the varying contour of such body. It is also desirable to retain such good physical engagement at all times during the treatment interval, whether such interval be short or extended in duration; and also to make provision for ensuring such continued good engagement between the bodily parts to be treated and the vibration producing element or elements even under the condition that the patient shall shift his posture from time to time to meet the needs of his comfort or otherwise. It is also desirable to make such provision in the form and nature of the vibration transmitting medium whereby the vibrations are transmitted to the bodily areas, that a substantially uniform contact pressure shall be produced and maintained between such bodily areas and such vibration transmitting medium or media. Thereby there will be produced a substantially uniform degree of the treatment effect produced by such vibrations during the duration of the treatment.

It is a prime object of the present invention to provide equipment or apparatus constituted to enable the production of all of the foregoing enumerated objects, as well as other objects presently to be disclosed.

Specifically, the apparatus includes a yieldable surface element upon or against which the specified area of the patient's body or head and/or neck portion, or other bodily part, shall rest or be sustained or contacted, together with means to deliver to such yieldable surface element the desired vibrations. Such yieldable surface element, and the vibration transmitting element or medium are so constituted or are of such nature, that the vibrations produced by the vibration producing and sustaining element shall be transmitted through such surface element and delivered to the bodily portion or portions of the patient in faithful transmission of frequency, and at substantially undiminished amplitude. Thereby, not only will it be possible to ensure subjection of the patient to exactly the frequency and amplitude of vibrations desired for the intended treatment, but also, in the case of transmission of music and other forms of sonic frequency, including talking and the like, it will be possible to ensure very faithful translation of such sound frequencies directly to the intended area or areas of the patient's anatomy. In this connection, actual use of the equipment presently to be herein disclosed in full detail, has shown that music tones and qualities not previously translated in audible form from the recording, have been brought to the patient's sense and brain perception, although without use of the oral organs of the ear and connected parts. Thus it has been found that the presently to be disclosed equipment is capable of producing translation of sounds and sound effects to the brain by direct vibrational operations, without loss of various of the tonal qualities not revealed by conventional forms of translation to the subject.

Broadly stated, my invention includes the provision of a yieldable cushion on or against which the human body or anatomical portion is sustained or pressed, such cushion being sufficiently yieldable to adapt its elemental areas to the varying bodily contour to ensure good contact between substantially all intended portions of the anatomy with such yieldable surface; such cushion containing a fluid body (generally water) filling its entire body so that vibrations delivered to one surface area of such cushion will be delivered through such fluid medium to all other elemental areas of such cushion in substantially undiminished amplitude and substantially without distortion. Also, the provision of means to drive such fluid medium through the cushion-like container with a pulsing effect, the rate of the pulses being in harmony with the intended rather slow frequency vibrations such as the rates of breathing or the rates of the heart-beats. This latter effect, produced by such pulsing of the fluid contents (generally water) through the cushion-like container, is conveniently produced by connection of conduits to opposite ends or sides of such container, and use of a pulsing type of pump to drive such water through the dimension of the cushion from inlet to outlet connection, while continuously maintaining the cushion completely filled with the water. The rate of such pulsing is adjusted to correspond with the breathing (actual or intended rate), or the heart-beat rate (actual or desired) of the patient. When a liquid medium such as water is contained in such cushion-like container, such pulsing effect travels along or across the container as a kind of wave front, thus corresponding subjecting the patient to a pulsing pressure effect at each location of such wave. Actually, in practice such pulses are effective almost simultaneously throughout the entire area of the cushion and thus are sensed by the patient over a large area or all of the cushion surface being contacted by his anatomy.

Such cushion-like element may comprise a flexible container of water-tight material, hereinafter referred to in full detail with inlet and outlet connections properly located for the ingress and exit of the fluid contents of the container; together with a supporting tray or the line into or onto which the container is seated; or such cushion-like container may comprise a tray of watertight material such as metal or plastic, to the upper edges of which tray is secured in water-tight fashion a sheet of flexible water-tight material, with suitable connections to the tray for ingress and exit of the water for the pulsing operations. In the former case—that in which the container is self-sufficient and is set into or onto a supporting tray or the like—such container may comprise a conventional type of "air mattress," filled, however, with water instead of air; such mattress being formed of suitable material, hereinafter described as "substantially non-stretchable, non-elastic, water-proof" material. It should be "non-stretchable" so that, once completely filled with water, the desired pulsing effect shall not be impaired or lessened, due to stretch of such material. When the equipment is also provided with the sonic or super-sonic vibration producing elements, such material should be of "physical-vibration-transmitting" quality so that the sonic or super-sonic vibrations set up in the body of contained water shall be transmitted through such material substantially without loss of amplitude due to deadening by such material; and to reduce distortion when the vibrations are of sonic frequency. I have herein disclosed one convenient and satisfactory form and composition of such material which complies with the requirements of being "substantially non-stretchable, non-elastic, waterproof, and physical-vibration-transmitting," but without any intention of limiting myself to such specifically disclosed material, except as I may limit myself in the claims to follow. Such material should also be used in the embodiment wherein I have provided a tray to the top edge of which the sheet of cushion-like material is attached.

A further object of my present invention is to provide a table or tray unit capable of use either with a sheet of the non-stretchable, non-elastic, waterproof, physical-vibration-transmitting material stretched over the top of such table or tray unit, in water-tight fashion, together with the vibration producing elements operationally connected to such table's floor or to the floor of such tray; or the combination of such table or tray unit with a mattress unit formed of such non-stretchable, non-elastic, waterproof, physical-vibration-transmitting material, set down into such table or tray element, and into contact with the floor thereof, so that the vibrations produced by such vibration producing elements shall be communicated directly to the patient supported by such mattress, with transmission of the vibrations through the material of such mattress element and the water contained therein. In each case cited above provision is also made for flowage of the water either through the table or tray element, or through such mattress, and for producing such flowage, preferably with regularly produced pulses.

I have also provided a special form of pillow which may or may not be used conjointly with such cushion-like element previously described. Such pillow is also formed of the non-stretchable, non-elastic, waterproof, physical-vibration-transmitting material, completely filled with water; and I have made provision for subjecting such pillow, when provided, directly with vibration producing elements acting to affect the water contained in such pillow element. Such pillow element may be used either in conjunction with the first described form of embodiment, by setting such pillow on the cushion-like surface thereof; or may be used independently of such larger unit. In any case I have also provided means to produce the desired vibrations, either slow or sonic or even super-sonic, in the body of such pillow, and for controlling the frequency and amplitude of such vibrations; or for producing in the body of such pillow the vibration of "audio-intelligence," both music and speech, with control of the amplitude thereof.

Under certain conditions it is desirable to produce the vibrations at a frequency of substantially 7,200 c.p.s., to match certain brain frequencies. I have made provision for producing such vibrations, and for controlling the amplitude thereof for certain forms of treatments of the patient.

I have also made provision for heating the water flowing through the system, so that the cushion-like body shall be of corresponding temperature. In this connection I have made provision for adjusting the temperature of such water, and for automatically maintaining such temperature at a pre-determined value.

It may be desirable to also subject the patient to the beneficial effects of various forms of light rays during the vibrational treatment. Accordingly, I have herein also disclosed a convenient form of enclosure over-covering the cushion-like unit, and have provided in the upper portion of such enclosure, or elsewhere as desired, suitable lamp elements capable of generating and delivering onto the body of the patient, the desired kind or kinds of such light rays. Generally the light rays desired to be used are either or both ultra-violet, U.-V., of infra-red (heating), I.-F. I have accordingly made provision for delivering either or both such kinds of rays down onto the patient supported by such cushion-like body. It is here noted that it may also be desirable to use such rays by a continuous series of pulses delivered to the patient's body, instead of a continuous, uniformly sustained strength of such rays. Accordingly, one or both of such lamp elements may be of form capable of delivering its rays in pulse form. This is especially true of so-called "Gas-Lamps" in which the alternating current delivered to them serves to illuminate them only for short intervals and at frequency corresponding to the frequency of the supplied current, generally 60 cycle current, producing 7,200 pulses per minute (3,600 for positive and 3,600 for negative half-cycles).

I have also provided an improved form of pulsing pump for delivering the water through the system as a series of distinct pulses; and have provided means to vary the rate of such pulses as desired.

Other objects and uses of the invention will appear from a detailed description of the same, which consists in the features of construction and combinations of parts hereinafter described and claimed.

In the drawings:

FIGURE 1 shows a side elevation of a table-tray unit which may comprise one portion of the elements constituting one embodiment of the present invention; and in this embodiment the cushion-like element comprises a sheet of the non-stretchable, non-elastic, waterproof, physical-vibration transmitting material stretched over a tray comprising a portion of such table-tray unit, suitable vibration producing elements being provided in connection with the floor of such tray for delivery of the vibrations to the water contained in such tray;

Figure 1:
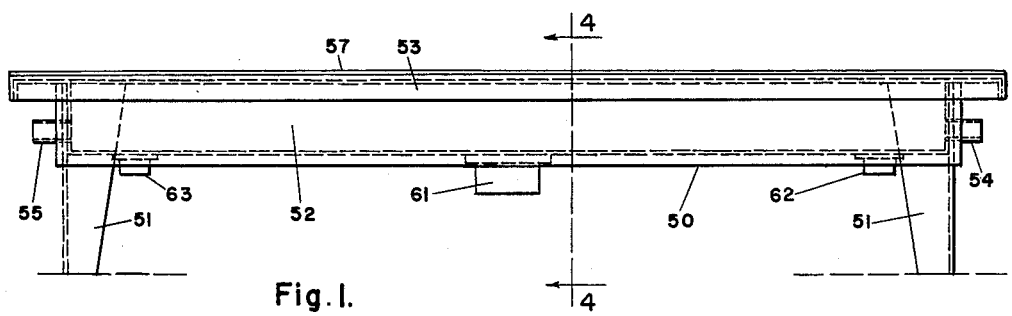
Figure 2:
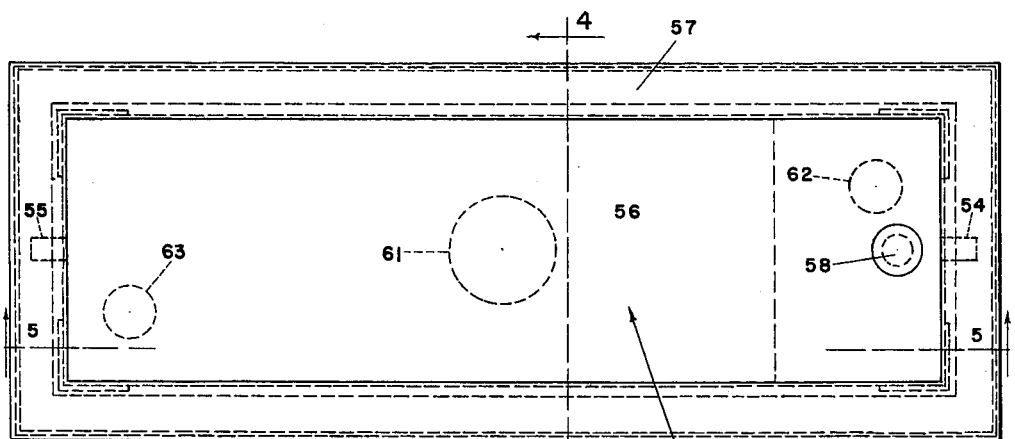
FIGURE 2 shows a plan view corresponding to FIGURE 1.
Figure 3:
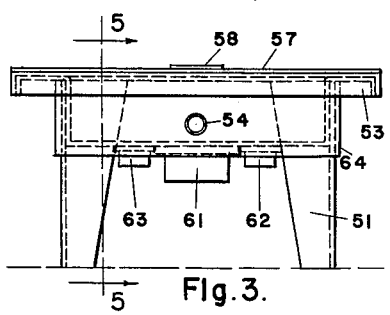
FIGURE 3 shows a right-hand end view corresponding to FIGURES 1 and 2.
Figure 4:
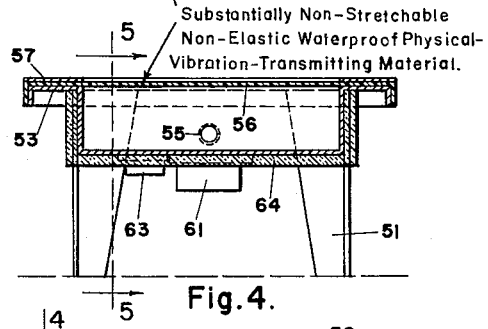
FIGURE 4 shows a transverse section taken on the lines 4—4 of FIGURES 1, 2 and 5, looking in the directions of the arrows.
Figure 5:
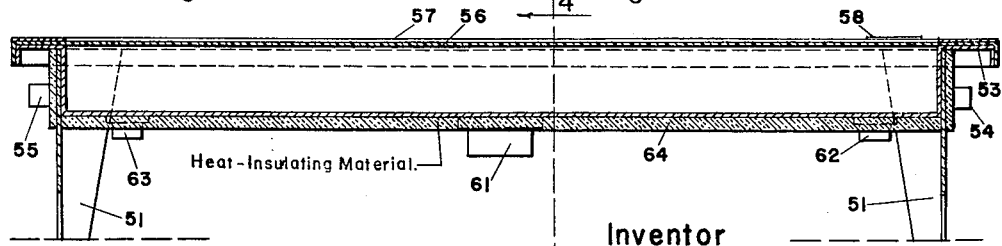
FIGURE 5 shows a longitudinal section taken on the lines 5—5 of FIGURES 2, 3 and 4, looking in the directions of the arrows.
Figure 6:
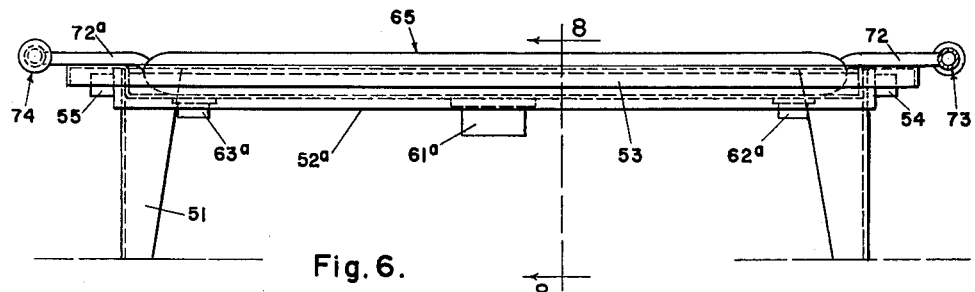
Figure 7:
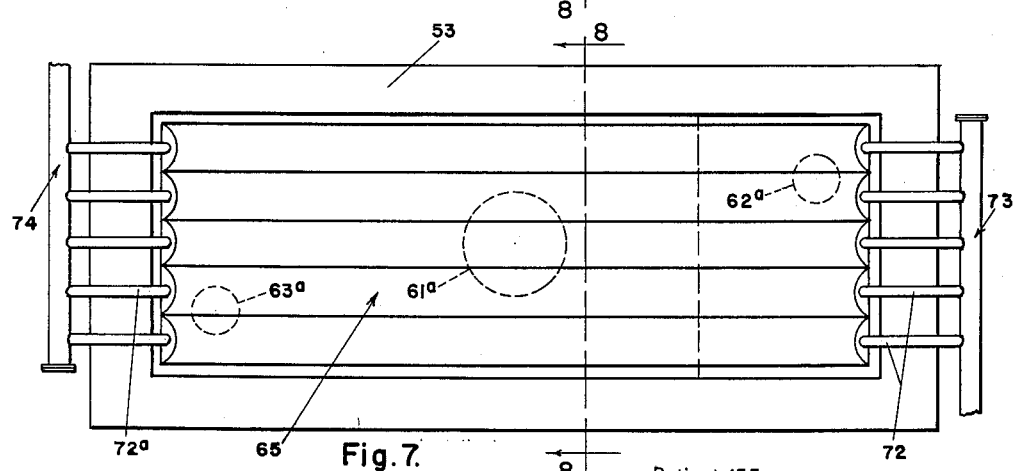
Figure 8:
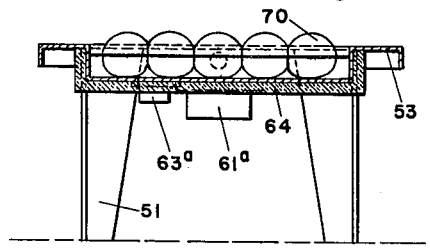
Figure 9:
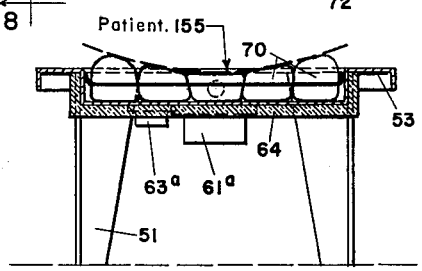
Figures 10, 11:
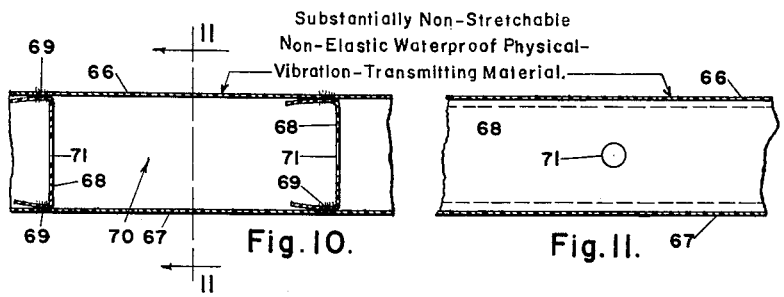
Figure 32:
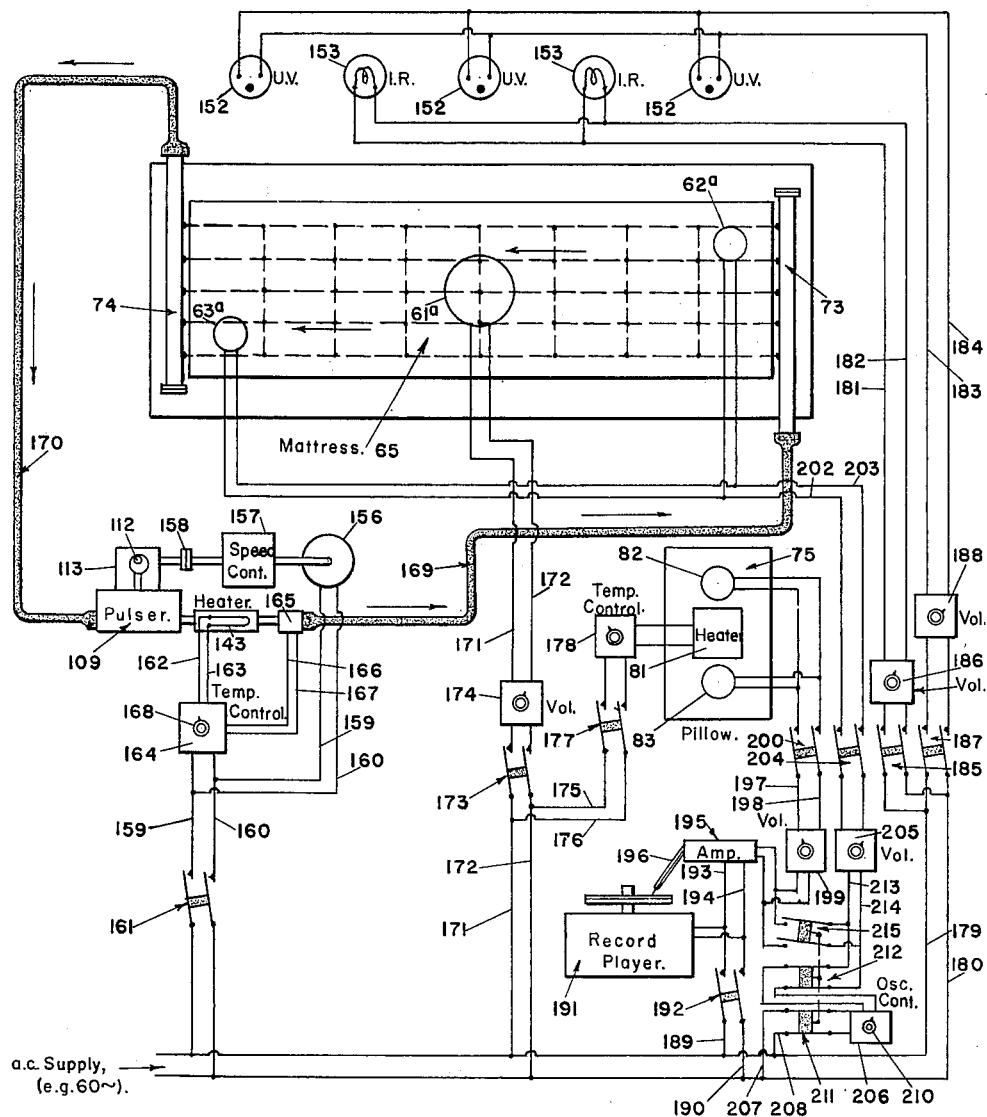

FIGURE 6 shows a side elevation corresponding to FIGURE 1, but illustrating a conventional form of fluid containing mattress seated into the tray of the table-tray unit, instead of the provision of a sheet stretched over the top portion of such tray as in FIGURE 1, such mattress being filled with water or other non-compressible fluid (liquid), with provision for circulating such water through the length of such mattress instead of through the body of the tray proper (directly); and in FIGURE 6 the longitudinal ribs of such mattress are shown in their fully distended projecting form such as they occupy prior to placement of a body on such mattress for treatment;

FIGURE 7 shows a plan view corresponding to FIGURE 6;

FIGURE 8 shows a cross-section taken on the lines 8—8 of FIGURES 6 and 7, looking in the directions of the arrows;

FIGURE 9 shows a cross-section similar to that of FIGURE 8, but it shows how, when a body is supported on the mattress filled with water or other non-compressible medium, and substantially without entrapment of air, a substantially uniform pulsing and/or sonic vibration producing support is provided for all portions of such so-supported body with substantially equal pressures over all elemental areas of given size over the supported area;

FIGURE 10 shows, on enlarged scale as compared to previous figures, a fragmentary portion of the mattress in cross-section; and this figure shows the spaced partitions between successive longitudinal conduits of the mattress, with openings through such partitions so that the hydrostatic-pressure developed through the entire body of the mattress is equalized;

FIGURE 11 shows a fragmentary longitudinal section taken on the line 11—11 of FIGURE 10, looking in the direction of the arrows;

FIGURE 12 shows a plan view similar to that of FIGURE 2, but with the sheet of substantially non-stretchable, non-elastic, waterprooof, physical-vibration-transmitting material left off, and prior to seating the mattress in the tray;

FIGURE 13 shows an enlarged elevational view of one form of vibration producing unit attached to the tray floor;

FIGURE 14 shows a typical cross-sectional view through a conventional form of "speaker" unit (shown in elevation in FIGURE 13), which may be used in connection with the tray floor to deliver vibrations, either sonic or of uniform frequency, to such floor, as desired; such form of "speaker" being provided with a permanent magnet element, such as of alnico metal, together with a "voice coil" for production of the desired vibrations of the diaphragm of such "speaker"; and this figure also shows a convenient arrangement for bringing such diaphragm of the speaker into good contact with a flexible sheet comprising a portion of the floor of the tray, and with production of a water-tight seal at such location;

FIGURE 15 shows a sectional view through an alternative embodiment of "vibrator" which may be used in connection with the floor of the tray, preferably when it is desired to produce high amplitude, uniform frequency vibrations instead of variable frequency, variable amplitude vibrations, such as the "voice" vibrations for which the unit of FIGURE 13 and 14 is well adapted; the unit shown in FIGURE 15 being a conventional form of such unit, known as the "Syntron" Model V-4, Electric Vibrator, for A.C. preferably of known frequency, such as 7,200 vibrations p.s., and made by the Syntron Company of Homer City, Pennsylvania;

FIGURE 16 shows a plan view of a "pillow unit" which may be used for local treatments of selected portions of the human anatomy, such as the back of the head and adjacent portion of the neck; such pillow unit incorporating certain of the novel features herein disclosed; and being usable either alone or on one end of the sheet of FIGURES 1 to 5, inclusive, or on one end of the mattress of FIGURES 6 to 9, inclusive; such pillow also being provided with its own vibration producing elements, so that music and other voice vibrations can be transmitted directly to the head and neck portions of the patient;

FIGURE 17 shows a partial longitudinal section through the pillow unit unit shown in FIGURE 16;

FIGURE 18 shows on greatly enlarged scale, a section through a portion of sheet material which is satisfactorily usable for production of the sheet shown in FIGURES 1 to 5, inclusive, and used in the production of the pillow unit, and used for the production of the mattress of generally conventional form; such sheet material comprising a woven web of substantially nonstretchable material such as nylon, together with a sheeting of plastic material having the qualities of being substantially non-stretchable, non-elastic, waterproof, and physical-vibration transmissions at high efficiency of vibration transmissions, a typical example of such plastic material being vinyl acetate which also has the property of being flowable through the mesh of the web and welding under application of heat, to produce substantially homogenous sheet of very high vibration transmission quality;

FIGURE 19 shows a convenient form of pulse producing pumping unit for pulsing the water or other liquid through the system; being a side elevation of such unit;

FIGURE 20 shows a plan view corresponding to FIGURE 19;

FIGURE 21 shows a vertical section through FIGURES 19 and 20, looking in the directions of the arrows; the crank element having been moved to a position of maximum angular deflection to one side;

FIGURE 22 shows a fragmentary section taken on the line 22—22 of FIGURE 21, looking in the direction of the arrows; and this figure shows a heating element directly inserted into the liquid delivery conduit from the pulser unit, such heating element being partially broken away to shorten the figure;

FIGURE 23 shows a face view of one of the cup-shaped plates which engage the flexible diaphragm of the pulser;

FIGURE 24 shows a cross-section taken on the line 24—24 of FIGURE 23, looking in the direction of the arrows;

FIGURE 25 shows, on enlarged scale as compared to FIGURE 21, one of the valve elements, looking at the delivery end thereof;

FIGURE 26 shows a view corresponding to FIGURE 25, but looking at the sealing end of the valve element;

FIGURE 27 shows a cross-section taken on the lines 27—27 of FIGURES 25 and 26, looking in the directions of the arrows;

FIGURE 28 shows a detailed cross-section taken on the line 28—28 of FIGURE 27, showing the stream-line form of the arms of the valve element;

FIGURE 29 shows a longitudinally sectioned elevation of a unit such as shown in FIGURES 1 to 5, inclusive, and elsewhere herein, provided, additionally, with a canopy or enclosure preferably of sheet material having a good light-reflecting interior surface, together with lamps and lamp-supports for delivering light rays such as ultra-violet and/or infra-red, down onto the patient, thus enabling production of both the vibration treatment and the light treatment simultaneously or sequentially, a portion of such canopy unit being broken away to reduce the height of the figure;

FIGURE 30 shows a right-hand end view corresponding to FIGURE 29;

FIGURE 31 shows a vertical cross-section taken on the line 31—31 of FIGURE 29, looking in the direction of the arrows; and FIGURE 32 shows a wiring diagram and flow-sheet of a typical installation including various of the features of invention herein disclosed, enabling the production of the treatments by various forms of the bodily vibration, together with light-treatments, and, if desired, provision of music or other forms of intelligence vibrations directly to the desired portions of the anatomy of the patient; and also including the pulse generating means, and the heating means for the water or other liquid body.

Referring first to FIGURES 1 to 5, inclusive, the embodiment therein shown comprises a tray unit 50, conveniently shown as supported by the legs 51 at elevation for ready mount by the patient, and for other operations. This tray as shown includes the peripheral flange 52 of which the upper edge is formed outwardly to provide a ledge 53 of planar contour. Liquid inlet and delivery connections 54 and 55 are provided, preferably at the opposite ends of the flange 52, so that water or other liquid may be flowed along the tray during operational treatment of the patient.

A suitable "cushion" element is provided in connection with the tray unit; and in the embodiment of FIGURES 1 to 5, inclusive, such cushion element comprises a sheet of supporting material 56 stretched over the tray and secured to the ledge 53 in watertight fashion. Another embodiment of such cushion element will be presently disclosed herein. Such sheet is thus conveniently secured to such ledge by provision of an encircling ring or flange element 57, drawn tightly towards the ledge element 53, as by bolts (not shown). It is intended that the space of the tray shall be completely occupied by the body of water or other liquid clear up to and into contact with the lower surface of the sheet 56, without entrappment of air. By so filling and keeping filled the space beneath such sheet, such sheet will be directly subjected to the vibrations transmitted through the substantially homogenous body of physical-vibration-transmission material of the water; and by forming such sheet itself of like physical-vibration-transmission material, it is evident that the patient supported by such sheet will also be subjected to such vibrations. The manner of production of the vibrations in the body of the water or other liquid will be revealed hereinafter.

It is now evident that such transmission of the vibrations of the body of water to and through the sheet will be dependent on actual good physical contact of the sheet with the top surface of the water. Any air pockets present in such water body will of course rise to the surface of the sheet, and will thus seriously break such direct physical contact between the water and the sheet. Any such air pockets would thus present a two-fold obstruction to the effective transmission of the vibrations of the water to the sheet. This is true since while water has a sound velocity transmission rate of substantially 4794 ft./sec., the rate of sound transmission through air at 32 degrees F. is substantially only 1088.5 ft./sec. Thus, at the location of any air bubble in contact with the lower surface of the sheet there would occur a delaying action in the arrival of sound vibrations reaching the sheet at such location as compared to the time of arrivals of such vibrations at surrounding areas of the sheet. But a further serious physical condition, due to the presence of such air bubbles, would be the destruction of the condition of homogeneity of the body of water, so that the vibration transmitting quality of the entire body of water within the tray would be seriously reduced. Such reduction would constitute a reduction of the efficiency of transmission of the sound waves through the water body to the surface of the sheet, with corresponding serious impairment of the amplitude and effectiveness of the vibrations delivered to the patient sustained by the sheet. Such presence of air bubbles in the body of water would, in effect, produce a condition of compressibility in the body of water, correspondingly impairing its sound vibration quality throughout such body.

In order to ensure substantially complete elimination of air bubbles from the body of water in the tray I have provided a sealable vent or valve element 58 in the sheet, preferably close to one end thereof. This may be of any convenient form, such as a sealable flap of the material from which the sheet itself is formed, together with a water-proof adherent on such flap surface which is brought into engagement with the perimeter of the hole in the sheet, after the tray has been filled up to the sheet's surface. By this arrangement, the tray may be tilted by raising its right-hand end (valve end), and then flowing the water into the tray until the space between the inner surfaces of the tray and the lower face of the sheet has been completely filled. Then such flap may be sealed to the surface of the sheet. Other arrangements will suggest themselves to the student of this specification.

Now, having thus completely filled the water receiving space, it is evident that such water may also be placed under a slight hydrostatic or hydraulic pressure, say, one pound sq./in., more or less. Then, as the water is flowed through the tray between the connections 54 and 55, provision may be made for maintaining such slight "base-pressure" in the body of the water. By such "base-pressure" I mean, not simply the pressure which will be hydraulically produced per sq./in. on the floor of the tray due to the depth of the water contained therein, but an additional slight pressure such that the surface of the water (top) will press slightly upwardly against the lower, inside surface of the sheet 56. This slight pressure will cause a slight upward bulge of the sheet over its area within the encircling collar element 57, it being noted that such sheet may be of size to comfortably receive and support the full length of a person of mature size, as for example, a sheet 84 inches long and 27–30 inches wide. Such sheet being flexible, it is evident that as soon as the patient takes his position thereon the sheet will be depressed in some of its portions and correspondingly elevated in other portions, so that the total volume of the liquid (non-compressible) contained within the tray and beneath the sheet, will remain substantially constant.

Here it is noted that I shall presently disclose another embodiment of the cushion element, and also a schematic diagram or flow sheet including the means to effect circulation of the liquid through the system, with production of periodic pulses or otherwise. This hydraulic system is a closed system, substantially air free, and thus constituting a substantially perfect water trap of total unchanging volume, although slight changes of volume may occur due to temperature changes and the like, but substantially without production of entrapped bodies of air, since the system is a closed system, and thus sealed against air entrance or exit. Now such closed system may of itself have a slight degree of expansibility and contractability within its elastic limit, thus taking care of needed slight changes in trapped volume but without entrance or exit of air. It is to be noted, however, that insofar as concerns the sheet 56 which, in FIGURES 1 to 5, inclusive, overlies the tray element 50, such sheet is preferably made from substantially non-stretchable, non-elastic, waterproof, physical-vibration-transmitting material, so that, once it has been secured over the tray, and is then subjected to the loads produced by the presence of a person lying on such sheet, such sheet will not, during a considerable interval of use, and under expected forces to which it is thus subjected, stretch appreciably. Thus, the hydraulic system being properly filled with water, under a slight base pressure, as previously explained, when the patient is lying on such sheet the sheet will accommodate its surface contour to the form and requirements or desires of the patient, over a very considerable surface area of the patient's anatomy, and not merely on a comparatively small area. Thus, too, the contact pressure developed between such sheet and the proximate surface areas of the patient's anatomy, will be substantially uniform in pressure for equal incremental areas of such contact between the patent and the sheet; the sheet will accommodate its contour to contours of bodily parts of the patient in supporting engagement with the sheet. As a result of the foregoing functional or operational conditions, the vibrations produced by or through the body of water within the volume thereof, will be transmitted to the human anatomy over the large area of anatomical contact with the sheet, with corresponding benefits.

The sheet has been defined as "substantially non-stretchable, non-elastic, waterproof, and physical-vibration-transmitting" material. As an example of such a sheet, I may mention a sheet formed of a web of substantially non-stretchable material, such as a web formed of warp and weft or woof nylon threads 59, together with a sheeting of plastic such as vinyl-acetate material 60 (see FIGURE 18), heat and pressure treated when laid against both faces of such nylon web, so that the plastic material is driven by such heat and pressure through the meshes of the web and cemented to the web threads, producing a substantially homogeneous sheeting of the plastic material, being waterproof, and the webbing thus embedded into such sheet, being also of high tensile strength, and substantially non-stretchable; the penetration of the vinyl-acetate through the web under heat and pressure producing a body of excellent physical-vibration-transmitting quality as distinguished from a sound-deadening quality of certain kinds of sheets. I have thus mentioned a specific form of sheeting, merely for the purpose of illustration of a form of such sheeting which is satisfactorily usable in the construction of a unit embodying features of my present invention, and not as a limitation, except as I may limit myself in the claims to follows.

I have referred to the production of various forms of vibrations to be delivered to the patient's anatomy, and have included therein vibrations of a frequency corresponding to heart-beats, to breathing, and other frequencies of the elements of the human anatomy. Frequencies of these kinds may be produced by producing bodily pulses in the body of the liquid contained in the cushion—the sheet 56 thus far described. I shall presently disclose a convenient means to produce such relatively slow pulses. Additionally, I have referred to the production of vibrations of much higher frequencies in the liquid body, and delivery of these frequencies to the human anatomy. For the production of these higher frequencies I have provided various forms of vibration producing elements in connection with the water or liquid container. Thus, in the embodiment of FIGURES 1 to 5, inclusive I have shown, schematically, the vibrator unit 61, of size to produce vibrations of the order of 50 to 1000 c.p.s., and of considerable amplitude, against the floor of the tray, thus subjecting such floor to corresponding vibrations. Such unit may correspond, for example, to a "woofer" of conventional functions as far as frequency and amplitude are concerned, as well known in the radio and allied arts. Such "woofer" vibrator is conveniently connected to the central portion of the floor so that its vigorous vibrations shall be distributed through the whole body of the water or other liquid, in substantially uniform manner. I have, in such figures, also shown the two additional vibrators 62 and 63, of smaller size, capable of producing vibrations of the frequency order of 500 to 5,000 or 20,000 c.p.s., but generally of less amplitude than the amplitude capacity of the vibrator 61, thus subjecting the floor of the tray to corresponding frequencies, and then transmitting such higher frequency vibrations to the patient as already referred to. Such smaller vibrators may correspond to the conventional "tweeter" vibrators or "speakers" of radio and like installations.

When two of such smaller vibrators are used they are conveniently located at diagonally opposite corners of the tray floor, thus distributing their vibrations in corresponding directions through the body of the water, and thence to the patient. If desired such two smaller vibrators may be used in connection with delivery to the patient vibrations corresponding to two sets of sonic reception, and on the basis of conventional bi-naural reception of a program, it being noted that the separation of such two vibrators at the two diagonally opposite corners of the device then corresponds to the desired separation of the two speakers of a conventional bi-naural reception radio installation.

I shall hereinafter illustrate, for purposes of example "speakers" of form satisfactory for use with both such "woofer" and "tweeter" vibrators; and shall also illustrate an alternate form of vibrator which may conveniently be used when it is desired to produce very high amplitude vibrations of pre-determined and fixed frequency.

I have also disclosed means to heat and control the temperature of the water or other liquid body, thus also controlling the temperature of the treatment to which the patient is being subjected. To make such temperature control more effective I have shown the tray 52 as covered with a sufficient layer of heat-insulating material 64. This is shown as overlying all exposed surfaces of such tray, including its bottom or floor, its ends, and its sides. It is also noted that such heat-insulating material is a good absorber of sonic vibrations; thus the wastage of vibrational energy through such so-insulated surfaces is much reduced, with corresponding amplification of the sonic energy delivered to the sheet 56, or other cover of the water body.

Reference is next invited to the alternate embodiment shown in FIGURES 6 to 11, inclusive. In this case I have made provision of a "mattress," generally designated as 65, of conventional form, but filled with the non-compressible body of liquid, generally water. Such mattress comprises the top and bottom sheets of waterproof material, 66 and 67 (see FIGURES 10 and 11, in particular), sealingly brought together at their ends, and generally provided with longitudinally extending partitions 68, as shown in FIGURE 10. Such partitions are conventionally "welded" to the two sheets in longitudinal "seams," 69, so that the parallel passages or conduits 70 are provided, extending lengthwise of the mattress, end to end thereof. However, these partitions are provided with regularly spaced openings 71 permitting lateral transfer of the liquid between such conduits, and thus permitting complete equalization of hydro-static pressures throughout the entire area of the mattress. According to my presently disclosed use of such mattresses I prefer to provide water inlet connections to the numerous conduits at one end of the mattress as shown at 72, and corresponding outlet or delivery connections 72ª from such conduits at the other end. I have also shown the inlet manifold 73 at the one end of the unit, and the outlet manifold 74 at the other end thereof, the connections 72 being connected to the one manifold, and the connections 72ª being connected to the other manifold as shown in FIGURE 7. These manifolds are connected to the water circulating system, in proper manner to ensure substantially uniform distribution of the water flow through the conduits, as will presently be disclosed.

When such a mattress is used it is conveniently set down into the tray unit 52ª of FIGURES 6, 7, 8 and 9, resting on the floor of such unit. Examination of such FIGURES 6, 8 and 9, will show that the tray thereof is shallower than the tray shown in the embodiment of FIGURES 1, 3, 4 and 5. This discrepancy is due to the fact that, when using the mattress type of embodiment the upper surfaces of the ribs constituting the conduits 70 should project above the rim portion of the tray as a matter of convenience to the patient supported by such mattress unit. Also, when using such mattress unit it is unnecessary to fill the tray proper with water, such water being contained within the body of the mattress unit.

Examination of FIGURES 8 and 9 will disclose generally the form which the ribs and conduits 70 assume when filled with water, prior to support of the patient on such mattress (FIGURE 8), and when the patient is being supported thereon (FIGURE 9). In the latter case (FIG-9) it is seen that the weight of the patient has crushed the several ribs and conduits into a more or less flattened condition, thus ensuring almost a continuous surface contact between the lower portions of the ribs and the floor of the tray. Examination of FIGURES 6, 7, 8 and 9 also shows that I have provided the tray thereof with the vibrator units 61ª, 62ª and 63ª, corresponding to like numbered units of the previously described embodiment. Accordingly, it is possible to deliver to the patient vibrations of selected frequency, kind, and amplitude, according to the principles already explained. Thus I find it unnecessary to describe the purposes and functions of such vibrators 61ª, 62ª and 63ª, in full detail here. It is, however, noted that when using the mattress type of embodiment shown in FIGURES 6, 7, 8 and 9 the material from which the mattress unit is formed should be of the non-stretchable, non-elastic, waterproof, physical-vibration-transmitting quality previously referred to; and the material already described for such use may also be used in production of such mattress. In this connection it is noted that when using the mattress type of embodiment, with the ribs and conduits of such mattress directly supported by the tray floor, the vibrations delivered by the units 61ª, 62ª and 63ª must be transmitted through both the lower and upper sheets of waterproof material; but such materials as already disclosed have been found to operate with a high degree of faithfullness and amplitude, when used for production of the mattress unit.

Due to the fact that the water or other liquid used in the mattress type of embodiment is contained within the body of such mattress itself, the side and end walls of the tray do not normally serve any water containing purpose; but it is desirable to use tray as a support for such mattress since, in case of a leak occurring in the mattress, the discharged water will be caught and contained against undesirable spillage.

Although both of the embodiments shown in FIGURES 1 to 5, inclusive, and in FIGURES 6, 7, 8 and 9, are capable of accommodating the full body of a patient, it is apparent that smaller units embodying features of my present invention may be produced for accommodating portions, only, of the human anatomy. Thus, in FIGURES 16 and 17, I have shown a unit in the form of a pillow embodying certain of the present features of invention. This pillow comprises upper and lower sheets of the desirable material, having their edge portions brought together in watertight fusion. These are the sheets 75 and 76, and their edge portions 77 are sealed together, the pillow having been filled with water or other liquid, and without the inclusion of air pockets. Conveniently, such unit thus produced is then set into a tray 78 having the flange 79 to which the pillow proper may be releasibly connected by snap-buttons 80 set into the edge portion 77 and engaged with companion elements secured to the tray flange 79 in conventional manner. A sheet of compressible material, 81, such as foam rubber, is set down into the tray prior to seating the pillow proper therein, thus providing a soft yieldable support for such pillow. Then the vibrations to be produced are produced by the vibrator units 82 and 83 having their diaphragms in effective engagement with the lower section 76 of the pillow. These vibrators are accommodated within suitable recesses provided in the body of such element 81, with the electric terminals of such vibrators brought out through the tray element 78 as shown in FIGURE 17.

If desired an electric heating element 84 may be secured to the pillow section 76, and accommodated within a shallow recess formed in such element 81, the terminals of such heater being brought out through the tray 78 as shown.

Reference is next made to FIGURES 13 and 14 which show a convenient form of vibrator capable of translating sonic vibrations into the floor of the tray 52 or 52ª, or the lower section 76 of the pillow unit. This sonic vibrator unit includes the shell 85 having the peripheral flange 86 which is set up against the bottom surface of the tray 52 (or 52ª) around an opening of such tray bottom. Included in such shell 85 is the U-shaped element 87 of magnetic material, having the opposite upwardly extending arms 88 and 89 magnetically connected to the inwardly reaching extensions 90 and 91 which, however, do not come together, leaving a space between them. The block 92 of high permeability, retentive, material, such as alnico metal, is secured to the central portion of the element 87, and extends up between the extensions 90 and 91, but with narrow air gaps between such block 92 and such extensions 90 and 91. The block 92 is permanently magnetized, thus providing a magnetic circuit between such block and both of the extensions, with flux flowing across both such air gaps.

A light, flexible diaphragm 93 is set above such block 92, and to its lower surface is "welded" the light, non-magnetic shell (generally made of rather stiff but thin paper) 94, of tubular form, such shell extending down through the air gaps and surrounding the upper portion of the permanent magnet block 92. The "voice" coil 95 is wound on such shell 94 and also extends down through both of the air gaps, being thus subjected to the influence of the flux flowing across such gaps. The sonic currents are passed through such voice coil, and thus there are produced vertical vibrations of the shell 94 and the diaphragm 93, of amplitude proportional to the variations of the "voice" currents. The terminals of such voice coils are not shown, for purposes of simplicity in illustration.

Preferably a waterproof light and flexible sheet of plastic, 96 is set down into facial contact with the upper surface of the diaphragm 93; and the peripheral portions of both the diaphragm 93 and of such plastic sheet 96 are drawn tightly to the upper surface of the floor 97 of the tray 52 (or 52ª), a ring 98 being set down onto the peripheral portion of the sheet 96, and the various layers being drawn tightly together by bolts or screws (not shown). Thus, at the location of such vibrator unit the floor of the tray actually comprises the exposed upper surface of the sheet 96. When the tray is filled with water (as in the embodiment of FIGURES 1 to 5, inclusive) such water will directly contact the sheet of plastic 96, thus depressing such sheet into firm, even pressure contact with the diaphragm 93 of the sonic vibrator (or "speaker"), and ensuring excellent transmission of the vibrations to the body of water contained in the tray. On the other hand, when the embodiment of FIGURES 6, 7, 8 and 9 is used, the tray not being filled directly with water, the lower surface of the mattress unit will deflect slightly to directly engage the upper surface of the sheet 96, thus exerting pressure of such sheet down into firm, even contact with the diaphragm 93, and ensuring excellent transmission of the vibrations to the lower surface of the mattress, and thus to the patient supported by the same.

Arrangements similar to that just described may also be provided for ensuring good engagement of the diaphragms of the sonic vibrators 82 and 83 with the lower surface of the pillow unit shown in FIGURES 16 and 17.

When it is desired to make provision for delivering especially strong vibrations to the patient, such as will at times be desired, such vibrations being of fixed or predetermined frequency, a vibrator unit such as shown in FIGURE 15 may be used. The unit there shown is a conventional unit known as the "Syntron" Model V-4 Electric Vibrator, produced by the Syntron Company, of Homer City, Pennsylvania. The unit shown in FIGURE 15 is intended for supply of A.C. 60 cycle current, and will produce vibrations of twice such cyclic frequency, being a vibration for each half-wave of current. This unit includes the shell 99 carried by the base element 100, which base element may be secured directly to the bottom of the floor of the tray 52 (or 52ª), as by the bolt 101. A U-shaped core 102 of magnetic material is secured to such base element, the coil 103 being mounted on one leg of such core. A flexible arm 104 (formed of several strips of spring metal) has one end anchored to the base 100 (or to the case), and its free or vibratory end carries the arm 105 to which is secured the armature 106 of magnetic material, and of length to span the space between the two legs of the core 102. The spring element 104 normally retains such armature displaced from the two legs as shown, but when the magnet is energized by electrifying the coil the armature is drawn upwardly, according to the wave form of the current supplied to such coil. A stop block 107 is set and secured in position to arrest the upward throw of the arm 105 with a sudden, but deadened shock, such shock being transmitted through the case to the base element, and thus to the floor of the tray. An adjustable screw 108 is provided for pressing against the spring element 104, and by adjusting such screw to produce a pre-set bias on the spring element the natural period of vibration (resonance frequency) of the arm and armature may be brought to the exact frequency of the supplied A.C., thus producing a vibration of maximum shocking force at such applied frequency. Such unit will be referred to hereinafter.

Reference has been made to the provision of means to produce a pulsing effect in the water or liquid contained in the cushion (either the embodiment shown in FIGURES 1 to 5, inclusive, or that shown in FIGURES 6, 7, 8 and 9), such pulsing effect generally being of rather slow rate, to correspond to the breathing period of the patient or to the rate of heart beats, either previously existing or which it is desired to induce in the patient. When such pulsing is to be produced, it is desirable that the pulses be in the nature of shocks of considerable magnitude. Accordingly, I have herein disclosed a pulsing unit in the nature of a pulse pump well adapted to meet the requirements of the present problem. This is shown in FIGURES 19, 20, 21, and 23 to 28, inclusive, to which attention is now directed:

This unit includes a shell comprising the lower cup-shaped unit 109 and the upper, generally ring shaped unit 110. The flexible diaghragm 111 of rather thick rubber has its peripheral edge portion clamped between the upper edge of the flange of the element 109 and the lower edge of the ring element 110 by screws or the like (not shown). A drive shaft 112 extends horizontally above the foregoing parts, being journalled in a stand 113 which extends upwardly from a plate 114 secured to the upper edge of the element 110. Such shaft 112 is driven by an input shaft 115 through the medium of a gear reduction in the form of the worm 116 carried by the input shaft 115 and drivingly engaging the worm gear 117 on such drive shaft 112. The drive shaft 112 carries an eccentrically mounted block 118 directly over the central portion of the diaphragm 111; and a pitman 119 has its upper end of circular form, 120, with the needle bearing 121 set between such circular portion and the eccentric block 118. Such pitman extends down through an ample opening 122 of the plate 114, and is connected to the central portion of the diaphragm 111. Such connection is established as follows:

Cup-shaped plates 123 and 124 are set with their central portions against the central portion of the diaphragm, and their concave surfaces facing away from such diaphragm, as well shown in FIGURES 19 and 21. The central portions of such cup-shaped plates are of diameter to embrace a portion of the diaphragm between them; and the lower end of the pitman is enlarged as shown at 125 to seat against the central portion of the upper plate element 123. A companion block 126 is set against the central portion of the lower plate element 124; and a screw 127 is extended up through the block 126, both of the plate elements 124 and 123, and the diaphragm 111, into the upper enlarged portion 125 of the pitman. Thus the diaphragm is rigidly connected, in its central portion, to the pitman, and must rock angularly with that pitman during its down and up travels. Thus such diaphragm is subjected to both direct up and down reciprocations, and also to twisting motions about an axis extending normal to the sheet carrying FIGURE 21. Such twisting must produce a slight stretching and contracting action in the diaphragm, but this requirement is met by the elastic nature of that element.

It is now evident that each up movement of the pitman is accompanied by an increase in displacement below the diaphragm, followed by the down movement of that pitman with a corresponding reduction of the space below the diaphragm. Thus suitable valving means are to be provided, together with inlet and delivery connections to the space below the diaphragm.

The ports 128 and 129 communicate with such space 130 beneath the diaphragm. A valve chamber communicates with each such port, being the chambers 131 and 132; and valve units are set into these valve chambers. One convenient form of such valve unit is shown in detail in FIGURES 25, 26, 27 and 28. It includes a cylindrical shell 133 of size to seat nicely in the corresponding valve chamber, but readily removable therefrom when adjustment or replacement is desired. Several radial arms 134 (four being shown in FIGURES 25 and 26) extend from such shell 133 to and are connected to a central hub portion 135, leaving ample passages between such arms, and between the shell and the hub portion. A stud 136 is carried by such hub portion, and extends lengthwise centrally of the unit. Conveniently, the shell, the arms, and the hub portion are all formed as a die-casting, the stud 136 being an insert cast into such element.

The valve proper comprises a disk of suitable material such as medium soft rubber, 137, set somewhat loosely on the stud, a light spring 138 being set around the stud and between the hub portion and the proximate face of the valve element. Conveniently the arms 134 are of tapered cross-section, as shown in FIGURE 28, the better to conform to the flow characteristics of the liquid during flow.

These valve units are set into their respective chambers 131 and 132 with their valve elements 137 both facing in the same direction. Thus, as shown in FIGURE 21 such valve units permit liquid flow rightwardly in both cases, the left-hand unit being the inflow unit, and the right-hand unit being the outflow or delivery unit. In this connection it is also noted that the conduit terminal 139 is set against and secured to the face 140 of the lower section 109 of the pulse unit, and that the conduit terminal 141 is set against and secured to the face 142 of such lower section 109, such faces 140 and 142 being flat for this purpose. Accordingly, the valve element of the inlet valve unit (left-hand unit, FIGURE 21), seats for closure against the end face of such conduit terminal 139, whereas the valve element of the delivery valve unit (right-hand unit, FIGURE 21), seats against the floor of the chamber 132 which accommodates such right-hand valve unit. Either or both of the valve units may then be readily adjusted or replaced by removing the corresponding conduit terminal.

I have already made reference to provision for heating the water or other liquid contained in the tray or other container. I have also referred to the heater unit 84 provided for the pillow unit, when used. Such pillow heater unit is thus provided as a distinct portion of such unit, since the pillow unit as shown is not connected to the water circulatory system, but is a self-contained unit, and thus is provided with its own heating element. However, when the system is one wherein the water or other liquid is circulated through the cushion unit, as shown in FIGURES 1 to 5, inclusive, and in FIGURES 6 to 9, inclusive, it is convenient and generally desirable to make provision of heating such circulating medium during its flow, and preferably between the pulser and the inlet connection to the cushion (the tray, in FIGURES 1 to 5, inclusive—the ribbed mattress, in FIGURES 6 to 9, inclusive). Accordingly, in FIGURES 21 and 22 I have shown an electrical heater element 143 located within the conduit element 141, such heater element comprising a conventional length of heating resistor, encased in heat-resisting, waterproof material, such as porcelain or other suitable material, such unit conveniently being folded back on itself, as shown in said FIGURES 21 and 22 to reduce the overall length of the conduit element 141. The terminals 144 and 145 of such heater element are brought out from the conduit element 141, as shown in FIGURE 22, for ready connection into the desired circuitry.

The inlet and delivery terminals of the pulser may be connected to the corresponding outlet and inlet terminals 55 and 54 of the tray type of embodiment, shown in FIGURES 1 to 5, inclusive, or to the manifold terminals 74 and 73, respectively of the embodiment of FIGURES 6 to 9, inclusive, as need be. Conveniently such connections are made by flexible hose of suitable material, such as plastic, so that the pulse unit and other elements may be set at convenient locations with respect to the cushion element; but in any case such hose or other conduit connections should be of substantially non-stretchable material. In FIGURE 32 I have shown and I shall describe a convenient form of system including the elements thus far revealed. It is, however, now noted that for certain physiological reasons and certain physio-therapy treatments it is desirable to use vibrations of the order of 7,200 c.p.s., as already referred to; and the vibrator unit shown in FIGURE 15 is well adapted for production of vibrations of that frequency, when supplied with A.C. from conventional 60 cycle current service openings, such vibrator producing one vibration of strong force corresponding to each half-cycle of the supplied current.

It is now further revealed that it is desirable to subject the patient, during certain physio-therapy treatments, to the effects of light rays, such as ultra-violet or infra-red, concurrently with the vibration treatments already provided for herein. Accordingly, I have, in FIGURES 29, 30 and 31, shown, more or less schematically, a simple form of enclosure by which such light-ray treatments may be produced concurrently with the vibration treatments, thus harmonizing both of such forms of treatment, and enabling the production of combined treatments, or either type of treatment separately, as desired.

Thus, in such FIGURES 29, 30 and 31, I have shown the post sockets 146 secured to the corners of the tray flange 53, the vertical posts 147 being removably set into such sockets. Such posts extend upwardly a convenient height, and carry the top frame including side stringers 148 and end elements 149, together with a central stringer 150, preferably at somewhat greater height above the tray than such side stringers 148. Then the sheet material canopy may be set over such framework, with side and end panels of such canopy hanging down to or slightly below the outer perimeter of the tray or mattress unit. Such depending panels are shown at 151 in various locations. They may be formed of suitable sheet material, generally of a cloth texture; but preferably the inner surfaces of such panels are painted or otherwise provided with surfaces of good reflecting quality for the ultra-violet rays, and/or the infra-red rays. For example, aluminium paint has a very good reflecting quality for the U.-V. rays, being of the order of 84-87% of the incident rays in the case of aluminium foils. Other U.-V. reflecting materials are suggested, such as coatings of thin steel, nickel, and especially the alloy known as Mach's Magnalium, consisting of 69 parts aluminium and 31 parts magnesium. This material has a very high reflecting quality for ultra-violet radiation, reflecting substantially 80% of the visible radiation, and substantially 67% of the radiation of 250 mu wave length. Such materials are suggested only by way of example, and not by way of limitation, except as I may limit myself in the claims to follow.

I have, in such FIGURES 29, 30 and 31, also shown several U.-V. radiators and several infra-red radiators supported by the stringer 150, these being the U.-V. lamps 152, three in number, and the infra-red lamps 153, two in number, the two sets of lamps being alternated as shown in FIGURE 29. Now, such U.-V. lamps are shown as "Gas Lamps," various makes thereof being conventionally available on the commercial market. Such lamps have the characteristic that their illumination is completely extinguished as the applied voltage falls below a critical value on each half-wave, and being again restored as such applied voltage rises above a critical voltage on each half-wave. Accordingly, as is well known, such lamps have the quality of producing illumination of pulsing nature, with the pulses substantially simultaneous with the voltage alternations. By using such lamps for production of the U.-V. illumination it is seen that the effects produced on the patient's anatomy by such illumination will be of pulsing nature; and thus, by such pulsing U.-V. treatment, combined with the physical vibrational treatment produced by such a vibrator as shown in FIGURE 15, it is possible to produce a highly desirable treatment of certain ailments, by such physiotherapy operations. It is also possible to employ the infra-red radiators which will produce the infra-red radiation in pulsing manner, and in synchronism with the physical vibrations; thus making possible such a combined treatment, physical vibrational and infra-red radiational, and also with or without the additional U.-V. pulsing treatment.

In FIGURE 31 I have also shown, by the light ray lines 154, typically, how the rays from a lamp may be reflected back and forth from the reflecting panels at opposite sides of the canopy, until finally such rays reach the body of the patient, shown at 155. Of course, in addition to such reflected rays the patient's body is also subjected to direct rays transmitted directly down from the several lamps.

Reference is now made to FIGURE 32 wherein I have disclosed, more or less schematically, a simple flow sheet for the circulation of the water or other liquid through the cushion, together with wiring diagrams disclosing means to effect the various vibrational operations, with control thereof, and have also shown the foregoing in combination with the means to provide for the radiation of either or both U.-V. and infra-red radiation to the patient being treated to the vibrational theraphy.

From the connection for supply of A.C. of the conventional frequency a supply of current is delivered to the motor 156 to the input shaft 115 of the pulser, through the change speed unit 157, and the coupling 158. Such current supply is provided over the lines 159 and 160, under control of the switch 161. From such lines 159 and 160 current is also delivered to the water heater 143 over the lines 162 and 163. Such heater current supply is under control of a temperature control unit 164 of conventional type. This includes a conventional "gas" bulb element 165 transmitting its tested condition over the lines 166 and 167 to such unit 164 for comparison purposes with the setting as adjusted by the knob 168. By this means the current supply to the heater element is regulated as needed to maintain the temperature of the water flowing to the cushion at the adjusted value corresponding to the setting of such knob 168.

The water delivered from the pulser delivery connection 141 flows through the conduit 169 to the manifold 73 at the inlet end of the mattress (or to the inlet connection 54 of the tray when such mattress is not used); and such water, after passing through the mattress (or through the body of the tray) is delivered from the connection 74 (or from the delivery connection 55 of the tray when such mattress is not used). Thence such delivered water flows through the conduit 170 back to the inlet connection 139 of the pulser. Conveniently such conduits 169 and 170 are formed of plastic; but in any case such conduits should be of substantially non-stretchable material, as previously stated. Thus the water circulates periodically through the system without change of total water volume. Such total volume includes the water contained in such conduits, that contained in the mattress (or the tray), and that contained in the pulser space below the diaphragm 111. The following functional condition is thus produced:

As the diaphragm of the pulser is raised, thus increasing the space beneath such diaphragm the volume of water then accommodated within the pulser increases. Accordingly, the volume of water contained in the mattress (or the tray) must decrease by exactly equal amount since, as stated, the conduits 169 and 170 are of substantially non-stretchable material. This means that the ribs of the mattress (or the elevation of the sheet 56 over the tray) must lower slightly, and in amount just sufficient to enable such mattress (or tray) to give up a volume of water exactly corresponding to the increased space beneath the diaphragm of the pulser. Per contra, when the rise of the diaphragm ceases and its downward movement commences, the space beneath such diaphragm must decrease, with corresponding transfer of water volume to the mattress ribs (or to the tray), thus producing a slight rise of such ribs or sheet of the tray. Such periodical lowering and raising of the mattress ribs or sheet of the tray will occur with a wave-like motion, commencing at the inlet end of the cushion element, and progressing rapidly to the other end; in fact, during normal operation at a pulsing rate corresponding to either breathing or heart-beats the changing actions seem to occur almost simultaneously over the entire length of the cushion, but at very low rates of pulsing such wave-like action may be pronounced.

The foregoing analysis also shows the effect which would be produced in case any portion of the water enclosure should suffer expansion or contraction since in such case the changes in volume beneath the pulser's diaphragm would be, at least in part, taken up by such stretch instead of being taken up by bodily change of the contour of the cross-section of the mattress. This difference in action may be emphasized by the following further explanation:

When the patient has assumed a posture on the mattress such as indicated in FIGURE 9, the volume of water contained in the mattress has not been changed by the downward depression of the ribs, but rather such ribs have been forced into a more rectangular form, but without change of the cross-sectional area of such ribs. This effect occurs by some transfer of water through the openings 71 between successive ribs among other actions. It is of course assumed that during the taking of such posture of the patient the pulser has not been in operation. It is true that the added weight or burden imposed on the mattress or tray sheet by the moving of the patient into posture must be taken up by an increase in the absolute hydraulic pressure developed in the water or other liquid; but the volume of such liquid has not changed. Then, assuming that the enclosing materials are of substantially non-stretchable material, the operations of the pulser will produce the slight risings and descendings of the sustaining surface on which the patient is resting. These pulses may be rather sharp and thus very noticeable to the patient.

Again referring to the diagram of FIGURE 32, I have shown the current leads 171 and 172 for delivering current to the vibration producing unit 61ª, under control of the switch 173 and the current control element such as the resistance 174. Thereby vibrations of fixed frequency may be developed by such unit 61ª, but with adjustable amplitude of such vibrations. Current may also be delivered to the pillow heater element 81, as by the leads 175 and 176, switch 177, and current volume control element 178 for controlling temperature of the pillow heater.

Next, provision is made for current supply to the U.-V. lamps and the infra-red lamps as follows:

The leads 179 and 180 supply current to the two pairs of leads 181—182 and 183—184, for the infra-red lamps 153, and the U.-V. lamps 152, respectively, the switch 185 and current or voltage regulator 186 controlling current supply to the infra-red lamps, and the switch 187 and current or voltage regulator 188 controlling current supply to the U.-V. lamps. It is here noted that such leads 179 and 180 also supply the current to the leads 159 and 160, and 171 and 172, so that the vibrator 61ª in particular is vibrated at the same frequency and in synchronism with the current variations to both sets of lamps.

It remains to describe the means for current supply to and control of the vibrators 62ª and 63ª of the tray unit, and/or the vibrators 82 and 83 of the pillow unit when provided. Such means are as follows:

Provision is made for supply of sonic vibrations to either or both such sets of vibrators as selected, with control of volume of such sonic vibrations (amplitudes thereof); or for supply of vibrations or fixed frequency and variable amplitude to the vibrators 62ª and 63ª, when provided. Such provisions include the following:

The leads 189 and 190 supply current to the record player 191 of conventional type (either disk or tape as selected), under control of the switch 192. Suitable connections 193 and 194 are also provided to the amplifier 195 which is fed by the pick-up 196 in conventional manner. From such amplifier 195 the sonic audio-frequency vibrations are fed to the speaker vibrators 82 and 83 of the pillow unit (when used) over the lines 197 and 198 under control of the volume control unit 199 and the switch 200. The lines 202 and 203 leading to the speaker vibrators 62ª and 63ª are under control of the switch 204 and volume control unit 205. Such volume control unit 205 receives its current supply as either audio from the amplifier 195 or as a fixed but adjustable frequency from the variable oscillator unit 206. For this purpose I have provided the leads 207 and 208 from the current supply lines 179 and 180, to supply the oscillator 206 of which the output frequency may be varied by the control button 210 in conventional manner, the switch 211 controlling supply of driving current to such oscillator. The output of controlled frequency from such oscillator is passed to the switch 212. From such switch such so-frequency-controlled currents are passed to the leads 213 and 214 and thus to the volume control unit 205 for such vibrators 62ª and 63ª. Another switch 215, when closed, supplies audio frequency sonic vibrations to such leads 214 and 215. The three switches 211, 212 and 215 are ganged together so that in one position (as shown in FIGURE 32) the switches 211 and 212 are closed, the switch 215 being open; whereas when in the opposite position such switch 215 is closed with the switches 211 and 212 open. Thus it is possible to supply the sonic vibrators or speakers 62ª and 63ª with either a fixed but adjustable frequency vibration, or with sonic or sound vibrations from the record player as selected by the position of the gang switch unit.

It is also to be noted that although I have herein shown a record player unit for translating permanent records for production of the sonic signals delivered to the "speakers," still I do not intend to limit myself to such record players of either the disk type or the tape type; but I also contemplate the combination and use of other forms of sonic frequency production, including, for example, sonic vibrations produced by natural voice emission, such as conventional telephone sounds, and also radio or like received signals, either A.M. or F.M., monophonic, stereo-phonic, and others.

It is, of course, understood that the sheeting of the cushion-like unit is flexible, so that it may accommodate itself to the requirements of the uses herein disclosed.

It is also to be noted that such a water or other non-compressible liquid filled cushion-like unit as shown, for example in FIGURES 16 and 17, may be used for various physio-therapy and like operations wherein the vibration producing elements are not required. Thus, in the case of a damaged section of the anatomy, such as a damaged arm wherein the nerves have ceased to function properly with corresponding local paralysis, a beneficial action may be produced by pressing and holding such a cushion-like unit against such damaged section, with good contact at both sides of the damaged area. Under this operation it will be found that nervous vibrations arriving at one side of such damaged area will be communicated through the water or liquid of the cushion-like unit to the other side of such damaged area, with actual transmission of nervous controls past such damaged area. Then, by continuing such treatment for a time interval it will be found that the damaged nerve elements at such area will gradually mend with final respiration of normal nervous controls.

I claim:

1. Physio-therapy apparatus comprising in combination a cushion-like flexible liquid-tight container formed of flexible sheeting of substantially non-stretchable, non-elastic, liquid-proof, physical-vibration-transmitting material, and substantially non-compressible liquid completely filling said container, together with a pulser unit comprising a liquid-tight variable volume chambers including a movable wall, inlet and outlet fluid connections to said chamber, single direction liquid flowcheck valves in said connections, the inlet fluid connection check valve permitting liquid flow into the chamber, and the outlet fluid connection check valve permitting liquid flow from the chamber, substantially non-stretchable, non-elastic, liquid proof conduits connecting the inlet and outlet connections of the pulser unit chamber with the cushion-like container at two separated locations of said cushion-like container, said substantially non-compressible liquid also completely filling said variable volume space of the pulser unit and said conduits, and means for periodically reciprocate the movable wall of the chamber with corresponding periodic indrive of the liquid into the cushion-like container at one location, and periodic outflow of the liquid from the cushion-like container at another location, the periodic indrive operations alternating between the periodic outflow operations.

2. Means as defined in claim 1, wherein the periodical volume varying means of the pulser variable volume space comprises means to regularly reciprocate the movable wall at regularly timed intervals.

3. Means as defined in claim 1, wherein the successive increases and decreases of volume of the variable-volume space are of equal amount.

4. Means as defined in claim 1, together with means to heat the liquid in the liquid proof conduit which connects the outlet connection of the pulser with the cushion-like container.

5. Means as defined in claim 2, together with means to vary the frequency of said regularly timed intervals.

6. Means as defined in claim 4, together with means to adjust the heating effect of said heating means to a pre-selected temperature.

7. Means as defined in claim 6, together with means to sense the temperature of the liquid, and means to pre-select the temperature, wherein the heating effect of the heating means is adjusted to said pre-selected temperature.

References Cited in the file of this patent

UNITED STATES PATENTS

| | | |
|---|---|---|
| 384,274 | Pelton | June 12, 1888 |
| 729,317 | Fleetwood | May 26, 1903 |
| 742,287 | Casper | Oct. 27, 1903 |
| 1,634,873 | Homan | July 5, 1927 |
| 1,678,564 | Eldred | July 24, 1928 |
| 1,874,286 | Gross | Aug. 30, 1932 |
| 2,245,909 | Enfiajian | June 17, 1941 |
| 2,437,006 | Simpson | Mar. 2, 1948 |
| 2,787,570 | Lott | Apr. 2, 1957 |
| 2,821,191 | Paii | Jan. 28, 1958 |